United States Patent Office 3,385,915
Patented May 28, 1968

3,385,915
PROCESS FOR PRODUCING METAL OXIDE
FIBERS, TEXTILES AND SHAPES
Bernard H. Hamling, Warwick, N.Y., assignor to Union
Carbide Corporation, a corporation of New York
No Drawing. Continuation-in-part of applications Ser.
No. 320,843, Nov. 1, 1963, and Ser. No. 523,549,
Jan. 28, 1966. This application Sept. 2, 1966, Ser. No.
576,840
13 Claims. (Cl. 264—.5)

ABSTRACT OF THE DISCLOSURE

Metal oxide fibers, textiles and shapes are produced by heating a preformed, organic polymeric fiber, textile or shape impregnated with a metal compound. The temperature is sufficiently high to carbonize and oxidize said organic polymeric fiber, textile or shape without igniting same, and to convert the metal compound to a metal oxide.

---

This application is a continuation-in-part of copending application Ser. No. 320,843 filed Nov. 1, 1963, now abandoned, and Ser. No. 523,549 filed Jan. 28, 1966, now abandoned, which latter application is in turn a continuation-in-part of copending applications Ser. No. 451,326 filed Apr. 27, 1965, now abandoned, Ser. No. 456,514 filed May 17, 1965, now abandoned, and Ser. No. 522,380 filed Jan. 24, 1966, now abandoned.

This invention relates to fibers, textiles and shapes composed of metal oxides which are substantially amorphous and to a process for producing them.

The invention makes possible new kinds of metal oxide fibers, textiles and shapes having useful combinations of properties not feasible or possible by other processes. For example, metal oxide fibers which have been produced in the past have all been subject to one or more of the disadvantages of low softening and melting points, extremely short length, brittleness, or low tensile strength.

Metal oxide fibers presently made are all subject to the limitations inherent in the process of drawing the fibers from the molten state and rapidly cooling before devitrification or crystallization of the fibers, particularly glass fibers, takes place. Metal oxide fibers produced by melt-drawing are further limited to mixtures of oxides containing appreciable amounts of certain metal oxides capable of forming a glass when cooled from the molten states. Silica, $SiO_2$, is the most widely used metal oxide, usually in amounts greater than 40 percent by weight, in forming glass fibers. Several other metal oxides can also be used to form fibers from the molten state, for example, $B_2O_3$, $GeO_2$, $P_2O_5$, $As_2O_3$.

Metal oxide fibers produced heretofore further require the use of high temperature melting furnaces and special crucibles and bushings for drawing the fibers. The present invention provides a novel and greatly improved method for forming metal oxide fibers which does not require the use of high temperature melting equipment, nor is the use of glass forming oxides required as an essential constituent of the fiber. Also, there has heretofore been no completely satisfactory method for producing metal oxide articles of predetermined irregular or complicated shapes. Previous methods have involved machining or other shaping techniques, or in the case of foams, the use of various blowing agents. These methods were either difficult and complicated or were unable to provide close control over the final shape of the article.

It is an object of the present invention to provide a novel class of metal oxide fibers which are not subject to the disadvantages and limitations of metal oxide fibers previously known. Another object of the invention is to provide fibers composed of a major amount of one or more metal oxides, which fibers are characterized by their substantially amorphous state, diameters in the range of 1 to 25 microns, length-to-diameter ratios in excess of 400 and tensile strengths in excess of 40,000 pounds per square inch. A further object of the invention is to provide a low-temperature process for producing fibers of metal oxides which have high melting points and which have high strength and flexibility. A still further object of the invention is to provide a variety of textile forms, including staple fibers, continuous tow and yarns, woven fabrics, batting and felts, composed of metal oxide fibers.

It is another object of the invention to provide shaped metal oxide articles, and a method for producing such articles from non-fibrous organic materials. Still another object is to provide a variety of films, tubes, cups and other shapes which are composed of metal oxides.

The fibers, textiles and shapes of the present invention are composed of a total of at least 80 percent by weight of oxides of one or more of the metals beryllium, magnesium, calcium, strontium, barium, scandium, yttrium, lanthanum cerium, and other rare earth elements, titanium, zirconium, hafnium, vanadium, niobium, tantalum, chromium, molybdenum, tungsten, manganese, iron, cobalt, nickel, copper, zinc, cadmium, aluminum, gallium, silicon, tin, lead, thorium, uranium and plutonium. Typical oxides of these metals are listed in Table I together with the melting point of the oxide or the temperature of decomposition in air (designated D) where the oxide does not melt. These metal oxides are characterized by decomposition or melting temperatures of at least 200° C. above the minimum efficient temperature (about 350° C.) employed in the process of this invention. Other oxides, such as $B_2O_3$, $P_2O_5$, $Na_2O$, $K_2O$, and the like, can be present in the metal oxide products of this invention but in amounts not greater than an aggregate of 20 percent by weight.

TABLE I

| Metal Oxide | Decomposition (D) or Melting Temp., °C. | Metal Oxide | Decomposition (D) or Melting Temp., °C. |
| --- | --- | --- | --- |
| BeO | 2,550 | $MoO_3$ | 759 |
| MgO | 2,800 | $WO_3$ | 1,473 |
| CaO | 2,600 | $MnO_2$ | 535 D |
| SrO | 2,415 | $Fe_2O_3$ | 1,565 |
| BaO | 1,917 | $Co_2O_3$ | 895 D |
| $Sc_2O_3$ | >1,500 | $Ni_2O_3$ | 600 D |
| $Y_2O_3$ | 2,410 | CuO | 1,126 D |
| $La_2O_3$ | 2,305 | ZnO | >1,800 |
| $Ce_2O_3$ [1] | >2,500 | CdO | 900 D |
| $TiO_2$ | 1,840 | $Al_2O_3$ | 2,050 |
| $ZrO_2$ | 2,680 | $Ga_2O_3$ | 1,740 |
| $HfO_2$ | 2,780 | $SnO_2$ | >1,900 |
| $V_2O_5$ | 690 | PbO | 890 |
| $Nb_2O_5$ | 1,520 | $ThO_2$ | 3,300 |
| $Ta_2O_5$ | 1,890 | $UO_3$ | 550 D |
| $Cr_2O_3$ | 1,990 | $PuO_3$ | 550 D |
| $SiO_2$ | 1,728 | | |

[1] Includes other rare earth oxides of the formula $M_2O_3$, wherein M is a rare earth metal.

The metal oxide fibers of this invention can exist in a wide variety of textile forms, including staple fibers ¼ inch to 3 inches or more in length, continuous length, tow, yarn and roving, woven cloth, knits, braids, felts and the like. The non-fibrous shapes of this invention can include sheets, sponges, foams and the like.

The term "amorphous" as used herein, means that the metal oxide is substantially micro-crystaline, that is, the crystallites are of such size that they are barely discernible by the conventional procedures of X-ray diffraction. Hence the term "micro-crystalline" can be used synonymously with the term "amorphous" in describing the metal oxide materials of the present invention. A poorly discernable X-ray diffraction pattern for a crystalline material is indicative of a crystallite size on the order of 1000 Angstrom units or less. It has been found that the metal oxide fibers of this invention can be prepared with crystallite sizes up to approximately 10,000 Angstrom units, a size having a reasonably clearly defined X-ray defraction, before a significant loss in strength is experienced. Fibers having crystallite sizes in the range below 1000 Angstrom units are preferable, however, if maximum strength is to be retained.

The process for producing the metal oxide fibers, textile and shapes of this invention comprises the steps of (1) impregnating a preformed organic polymeric material with one or more compounds (preferably salts or hydrolysis products of salts) of metal elements which form the metal oxides of Table I and (2) heating the impregnated organic material under controlled conditions (which prevent ignition of the material) and at least in part the presence of an oxidizing gas to (a) convert (pyrolyze) the organic material to predominantly carbon and thereafter remove the carbon as a carbon-containing gas, and (b) oxidize the metal compounds(s) to their respective metal oxide(s). There results a metal oxide fiber, textile or shape which has essentially the same physical configuration as the original polymeric material.

The term "preformed" as used herein means that the organic polymeric material has been fabricated into a fibrous or non-fibrous shape prior to impregnation with the metal compounds.

The physical form and shape of the metal oxide product is essentially the same as and is determined by the physical form of the preformed organic starting material, although considerable reduction in size takes place. During conversion of impregnated organic fibers to the metal oxide fiber form, both the diameter and the length of the fiber shrink to approximately 40 to 60 percent of the original dimensions. Similar shrinkage in all dimensions also takes place with the non-fibrous shapes.

Where a yarn composed of a multiplicity of continuous-length metal oxide fibers is desired, a continuous-filamine organic yarn is employed as the starting material in the process of this invention. Similarly, where a woven fabric or felt composed of metal oxide fibers is desired, a woven organic fiber cloth or felt can be used as the starting material. Of course, metal oxide woven textiles can be made using conventional textile equipment and techniques starting with metal oxide staple fibers or yarns made by the process of this invention.

Without being bound by same, the theory and mechanism of this process appears to be as follows: Microscopically, organic polymeric materials, such as cellulose, are composed of extremely small crystallites of polymer chains (micelles or microfibrils) held together in a matrix of amorphous polymer. When the organic material is immersed in a solvent, such as water, aqueous solutions, or organic solvents it swells, thus opening the interstices between the crystallites. The amorphous regions enlarge and the crystallite spacing increases. The dissolved metal compound, such as a salt, enters the swollen amorphous regions, which is generally about 50 to 90 percent of the volume of the swollen organic material, and becomes trapped in the amorphous regions between the crystallites when the solvent is removed from the material.

The metal compounds do not crystallize upon drying of the organic material, as would normally occur upon drying most solutions, since they are effectively suspended and separated as islands, about 50 A. in size in the case of cellulose, between the polymer crystallites.

The organic polymeric material can be impregnated with two or more metal compounds from the same solvent solution, so that fibers, textiles or shapes containing more than one metal oxide can be prepared. In the first approximation, most metal compounds enter the interstices in direct proportion to their solution concentration, allowing ready control of the relative loadings of metal compounds in the organic material. Due to the blocking action of the organic crystallites, the metal compounds cannot segregate from each other nor crystallize during the subsequent steps.

Any organic polymeric material can be employed as a starting material in the process of this invention providing it is characterized by the above-described structure of extremely small crystallites held together in a matrix of amorphous regions which enlarge and admit the metal compounds on immersion in the solvent. Any class of materials which are composed of long-chain molecules held together by chemical cross-links can also be used, provided these materials are capable of swelling and absorbing a solvent and provided the organic polymeric material does not melt on heating. Any cellulosic material can be employed including rayon, saponified cellulose acetate, cotton, wool and ramie, and the like. Other suitable organic materials include the protein materials (such as wool and silk) and the man-made acrylics, polyesters, vinyls and polyurethanes. Certain organic materials, such as polyethylene and polypropylene, are not suitable for practicing the instant process because they cannot be swollen for imbibition of the metal compounds and/or the materials melt and lose their structure during pyrolysis. A preferred cellulosic material is rayon due to its structural uniformity, good imbibition characteristics and low impurity content.

Impregnation, or imbibition, of the organic matter can be carried out by several methods. Where the element which will appear in the final metal oxide article has salts which are highly soluble in water, the impregnation step can be carried out by immersing the organic material in a concentrated aqueous solution of such salt. For example, where an aluminum oxide fiber is desired, an organic fiber can be impregnated by immersion in an aqueous solution of aluminum nitrate or aluminum chloride having concentrations in the range 2.0 to 3.0 moles of salt per liter. For salts which hydrolyze (acid reaction) when dissolved in water, the acidity of the impregnating solution is preferably not greater than 1.0 molar (in hydrogen ion) in order to prevent degradation of the organic material during immersion. The acid may be neutralized with ammonia, if desired.

In order to obtain adequate strength in the final metal oxide product, cellulosic materials are imbibed with the metal compounds to the extent of at least one-quarter mole and preferably 1.0 to 2.0 moles of the metal compound(s) in each "base mole," of cellulose. The term "base mole" as used herein refers to the molecular weight of a glycosidic unit of the cellulose chain (molecular weight of 162). With non-cellulosic materials, the degree of imbibition should be at least 0.1 and preferably 0.5 to 1.0 gram-equivalent metal ion in the metal compound imbibing solution per gram of organic material. With lower concentrations of metal compound(s), insufficient metal salt is available in the relic fiber, textile or shape for a strong article and the process becomes less efficient in terms of product yield per unit weight organic starting material.

Pre-swelling of cellulosic organic materials in water prior to immersion in concentrated imbibing solutions is preferably employed to increase both the rate and extent of salt imbibition. For acrylic and polyester materials, aromatic alcohols are suitable swelling agents, and the ketones are useful in swelling vinyl and polyurethane materials for the same purpose.

Water is the preferred solvent for metal compound-imbibing of cellulosic materials. Other solvents such as alcohols do not afford as efficient swelling nor solubility of the selected metal compound for a high degree of imbibing. For vinyl and polyurethane materials, esters and ketones are appropriate solvents, as for example normal butyl acetate or methyl ethyl ketone. For acrylic and polyester materials, suitable solvents for the metal compound imbibition include aromatic alcohols and amines such as aniline, nitro-phenol, meta-cresol and paraphenylphenol.

Immersion times at normal room temperatures (21–23° C.) required to give adequate impregnation vary from a few minutes to several days depending on the salts(s) employed and the type of organic material employed. For example, at 21° C. water-swollen regular viscose rayon imbibes 0.9 mole $UO_2Cl_2$ per base mole rayon from 3.3 molar solution in 30 minutes. Imbibition of $AlCl_3$ from concentrated solutions at 21° C. takes place more slowly. For example, under the same conditions as described above for $UO_2Cl_2$, water-swollen regular viscose rayon imbibes $AlCl_3$ to the extent of 0.4 mole per base mole rayon 30 minutes. After 3 days' immersion, $AlCl_3$, is absorbed in rayon to the extent of 0.7 mole per base mole rayon. Immersion times greater than about 3 days in concentrated salt solutions is undesirable for cellulosic material since the material may degrade, resulting in a decrease in the amount of salt absorbed, and in the case of fibers, causing the fibers to bond to each other.

To further illustrate the impregnation step, viscose rayon rapidly swells and absorbs $ZnCl_2$ to a large extent in concentrated solutions. Within 15 minutes water-swollen viscose rayon absorbs 3.4 moles of $ZnCl_2$ per base mole of rayon from a 6.8 molar solution at 21° C. However, the rayon impregnated by this treatment swells to essentially a gel and becomes tacky. The rayon in this swollen state is too weak to be handled and the fibers cannot be separated from each other. The preferred process for impregnating rayon with $ZnCl_2$ so that the salt-loaded rayon is not degraded and fibers are not bonded together, is immersion of water-swollen rayon in 3.6 to 4.0 molar solution for 1 to 3 hours. By this treatment, viscose rayon absorbs 0.6 to 1.0 mole of $ZnCl_2$ per base mole of rayon.

When it is desired to increase the rate of imbibition of the metal compounds in the organic materials to shorten immersion time, the metal compound solution may be heated to as high as 100° C. For example, for salts which are taken up by cellulosic fibers at a slow rate, such as $AlCl_3$, $Al(NO_3)_3$, $ZrOCl_2$, and $ThCl_4$, the immersion time can be shortened by raising the temperature of the salt solution to 50° C. to 65° C. Care should be exercised, however, in using elevated temperatures since many salts will grossly degrade the organic material at high temperatures.

An alternate method of loading the organic polymeric material is to employ compounds which hydrolyze or react with water to form metal oxide products which are essentially insoluble in water. This chemical property is utilized to effect impregnaion of organic materials with these metal oxides as described below. Suitable hydrolyzable and/or water reactive compounds include the following: (1) $VOCl_3$, $VCl_2$, $VCl_4$ to yield $V_2O_5$; (2) $NbOCl_3$, $NbCl_5$, $NbBr_5$ to yield $Nb_2O_5$ hydrate; (3) $TaCl_5$, $TaBr_5$ to yield $Ta_2O_5$ hydrate; (4) $MoCl_5$, $Mo_2O_3Cl_6$ to yield $MoO_{2.5-3.0}$ hydrate; (5) $WCl_6$, $WCl_5$ to yield $WO_3$ hydrate (tungstic acid); and (6) $SiCl_4$ or silanes such as trimethylsilane to yield $SiO_2$. The above named metal halides or oxyhalides are dissolved in an organic liquid immiscible with water, such as carbon tetrachloride, chloroform, carbon disulfied, ethyl ether, or benzene, to the extent of 5 to 50 g. of metal halide or oxyhalide per 100 ml. of organic liquid. The rayon or other cellulosic or organic material is exposed to air having a relative humidity between 50 and 90 percent, in order for the material to swell by absorbing between 5 and 30 percent by weight of water. While still swollen and containing the absorbed water, the organic material is contacted with the metal halide or oxyhalide by immersion in liquid or gaseous halide or oxyhalide or in organic solvent solutions of halide or oxyhalide. As the metal halide or oxyhalide penetrates the moist material, reacts with the water, and an oxide precipitate forms directly in the organic material structure. This hydrolysis reaction is normally complete in 20 to 30 minutes.

The extent or amount of metal deposited within the organic material is directly a function of the amount of water absorbed in the material. Typical hydrolysis reactions are the following:

$$SiCl_4 + 3H_2O \rightarrow H_2SiO_3 + 4HCl$$
$$TiCl_4 + 2H_2O \rightarrow TiO_2 + 4HCl$$
$$2TaCl_5 + 5H_2O \rightarrow Ta_2O_5 + 10HCl$$

The amount of water absorbed in the organic material is readily controlled by exposing the material to air containing the desired amount of moisture. For maximum water absorption the material can be immersed directly in liquid water. For example, the amount of water absorbed in textile-grade viscose rayon fibers in equilibrium with moisture in air and liquid water at 75° F. is shown below:

| Relative humidity at 75° F.: | Moisture content, percent of dry fiber weight |
|---|---|
| 10 | 4 |
| 30 | 8 |
| 50 | 10 |
| 70 | 14 |
| 80 | 17 |
| 90 | 23 |
| 95 | 30 |
| 100 (immersed in water) | 80–110 |

Some hydrolyzable metal compounds are liqiud at normal conditions and the water-laden organic material can be immersed directly in the metal compound to cause the hydrolysis product to be formed in the material. Examples of liquid metal halides are $SiCl_4$, $TiCl_4$, $VOCl_3$ and $VCl_4$. However, many of the hydrolysis reactions proceed very rapidly with the evolution of heat. The resulting severe conditions may degrade or break up the organic material; in this event the metal compound is preferably diluted with a non-reactive, miscible liquid to avoid such conditions. Many non-polar organic liquids, such as benzene, toluene, hexane, carbon tetrachloride, chloroform, are suitable non-reactive liquids. These organic liquids, when used as diluents for the metal compounds, slow the rates of hydrolysis and help to dissipate the heat of reaction. Unreacted metal compound liquid (as well as any diluent) may be removed from between the fibers by evaporation, since they have high vapor pressures.

Other metal compounds which can be incorporated in polymeric organic materials by hydrolysis reaction but which are not normally liquids are best utilized when dissolved in a non-reactive liquid which is immiscible with water. Such metal compounds, for example, include $TaCl_5$, $NbCl_5$, $ZrCl_4$, $UCl_4$. Suitable solvents are bromoform, carbon tetrachloride, diethyl ether, and nitrobenzene.

Following imbibition with metal compounds(s) from a solvent solution, it is necessary to remove excess solution from between the organic fibers before they dry in order to avoid bonding together of fibers by caked salt, or from the surface of non-fibrous shapes in order to prevent accumulation of caked salt on the surfaces of the shape. Allowing excess unimbibed metal or hydrolysis product to remain results in reduced strength and increased brittleness in the final metal oxide product. Blotting thoroughly with absorbent paper or cloth using moderate pressure is useful for removing excess solution from the organic material. In addition, washing, high velocity gas streams, vacuum filtration and centrifugation have proven to be effective methods for removing excess impregnating solution. For solutions, such as 3.0 molar $AlCl_3$, having viscosities greater than about 10 centipoises, raising the temperature of the organic material to 50–60° C., aids in removing excess solution.

The impregnated organic material is then thoroughly dried by any convenient means, such as air drying or heating in a stream of warm gas. It is desirable to dry the impregnated fibers rapidly (in about one hour or less)

to prevent expulsion of salt from the interior of the organic material to its surface.

When a product containing two or more metal oxides is desired, the organic material is impregnated with two or more salts or hydrolysis products. If two or more water-soluble salts are employed, the impregnation can be carried out by a single immersion in an aqueous solution containing both salts. When two oxides are desired, one of which is impregnated into the organic material from aqueous solution and the second impregnated by hydrolysis of the metal halide or oxyhalide from organic solution, a preferred method is to impregnate first with the hydrolysis product and then with the water soluble salt.

In the next principal step in the process of this invention (the conversion of the impregnated organic material to metal oxide) the impregnated organic material is heated under controlled conditions for a time sufficient to decompose the organic structure and form a carbonaceous relic shape containing the metal compound in finely dispersed form, and concurrently and/or subsequently to eliminate the carbon and convert the metal compound to metal oxide.

The controlled conditions must be such as to avoid ignition of the organic material. For the impregnated organic materials used in the process of this invention, ignition generally takes the form of an uncontrolled temperature increase within the material rather than combustion accompanied by flame. An uncontrolled temperature increase is a rapid increase which deviates sharply from the heating pattern of the impregnated organic material and its environment. When pyrolysis conditions are properly controlled, the temperature increase in the impregnated organic material follows closely the temperature of its surroundings (atmosphere, furnace wall, and the like) even though the exact temperature of the organic material may fluctuate to temperatures both above and below the nominal temperature of the environment. If the organic material ignites or burns instead of carbonizes, the metal compound temperature rises excessively due to its contiguous relation to the organic structure. Under such circumstances it is impossible to control the temperature, and the melting point of intermediate metal compounds formed may be exceeded or excessive crystallization and grain growth can occur. Also the metal compound may become suspended in the pyrolysis product vapors, and thus lost from the environment and unavailable to form the desired relic. When ignition is avoided the products have smoother surfaces and are stronger due to a more orderly consolidation of the metal compound particles.

In practice, a convenient way of determining whether or not ignition has taken place during the heating steps is to observe the degree of shrinkage or consolidation of the starting organic material. Where ignition has not taken place, the impregnated organic material undergoes substantial shrinkage along its longest dimension, generally in the order of 40–60 percent. (Shrinkage from 10 cm. long to 5 cm. long is 50 percent shrinkage.) The final product is strong and microcrystalline, and in the case of fibrous products, highly flexible. On the other hand, where undesirable ignition takes place during the heating steps, the degree of shrinkage is considerably less, and the resulting product tends to be crystalline rather than microcrystalline and is brittle and of low strength. If ignition takes place toward the end of the carbonization-oxidation step, the degree of shrinkage may still be substantial but the physical properties of the product will be less desirable. In general, the degree of shrinkage is inversely proportional to the loading of metal compound into the organic material. It has been found desirable to adjust process conditions to obtain maximum shrinkage for the particular metal compound loading in the impregnated organic polymeric material.

In practice, it has been found that ignition can be avoided by use of controlled reaction conditions, particularly conditions which avoid sharp changes in temperature, atmosphere composition and the like. Sharp changes in conditions tend to precipitate the uncontrolled temperature increases within the impregnated organic material which constitute ignition as hereinabove defined.

As an example of such controlled condition, cellulosic fibers impregnated with metal salts are heated to a temperature between about 350° C. and 900° C. at a rate of not more than 100° C. per hour in an atmosphere containing between 5 and about 25 volume percent oxidizing gas. (It is understood, of course, that where the metal oxide product is to contain one of the oxides of Table I which has a decomposition or melting point below 900° C. the impregnated organic material is not heated above such decomposition or melting temperature.) By the time the impregnated fiber has been heated to 350° C. or above, under the above-described conditions, a major portion of the cellulosic fiber will have been pyrolyzed to carbon (carbonized) and the carbon removed as a carbon containing gas through reaction with the oxidizing gas (volatilized), and a major portion of the metal element in the impregnated fiber will have been oxidized to the metal oxide form. The impregnated fiber should, however, be maintained at a temperature between 350° C. and 900° C. in an oxidizing gas-containing atmosphere until substantially all of the impregnated fibers have been carbonized and volatilized and substantially all of the metal has been oxidized to the metal oxide form.

After the first slow heating to a temperature above 350° C. the volume percent of oxidizing gas need not be maintained at 25 volume percent or below, although there is generally no signficant advantage in employing an atmosphere containing greater than 25 volume percent oxidizing gas. The preferred oxidizing gas is oxygen, although other oxidizing gases such as nitrogen dioxide and sulphur trioxide can be used if desired. The balance of the gaseous atmosphere comprises gases which are chemically non-reactive at temperatures up to 900° C. and above. Typical non-reactive gases include nitrogen, helium, argon, neon, and the like.

A preferred embodiment of this invention for producing fibrous metal oxide products comprises (1) impregnating a cellulosic fiber as described hereinabove with compounds of metals of Table I whose oxides have melting or decomposition temperatures above 800° C., and (2) heating the fiber to a temperature between about 400° C. and 800° C. at a rate between 10° C. per hour and 100° C. per hour in an atmosphere containing from 5 to 25 volume per cent oxygen, and thereafter maintaining the fibers at a temperature between 400 and 800° C. in an oxygen-containing atmosphere until substantially all of the fibers have been carbonized and volatilized and substantially all of the metal has been oxidized to the metal oxide form.

In this process of this invention, the important factor is that the process variables be controlled to avoid ignition and/or burning of the organic portion of the impregnated organic material. Control of process variables to avoid ignition can be carried out in many ways; for example, by temperature regulation, by limiting the amount of oxidizing agent available to the impregnated material, or by the use of vacuum or inert atmosphere. It must be remembered that a certain amount of oxygen forms a part of the chemical structure of many organic materials, for example cellulose, so that a certain amount of oxidizing agent is available within the impregnated material itself. Here the use of smaller samples of impregnated material or relatively slow heating rates, particularly to temperatures up to about 350° C., can help to avoid undesirable ignition. It has been found, however, that with many systems, particularly impregnated cellulosic fibers from which excess solvent has been removed and which have been carefully dried, that rapid heating in vacuum or inert atmosphere is possible without causing ignition.

In the step in the process of this invention in which the metal compound is oxidized to metal oxide, it is necessary to supply some type of oxidizing agent. As indicated above, this is most conveniently done by heating the carbonized (and in many instances partially oxidized) material in an atmosphere containing oxygen or other oxidizing gas. It is of course necessary to avoid ignition during the oxidation step also. This can again be achieved by careful control of temperature, by limiting the amount of oxidizing gas supplied, or by employing relatively unreactive oxidizing agents. An example of this latter technique is to employ water vapor at temperatures above about 700° C. as the oxidizing agent. Particularly good results have been achieved by heating the carbonized material in an inert gas containing a few percent water vapor.

Control of conditions to avoid ignition is generally easier with fibers and fibrous materials such as textiles than with other non-fibrous shapes, such as organic forms or sponges, which have been impregnated with metal compounds. For such non-fibrous shapes it is generally preferred to use non-oxidizing atmospheres in the initial portion of the carbonization-oxidation process and to maintain the rate of heating at less than 50° C. per hour. An oxidizing agent can thereafter be added to the atmosphere after a substantial portion of the carbonization step is completed. It is also possible to carry out the entire carbonization-oxidation treatment of non-fibrous shapes by heating at rates between 10° C. and 50° C. per hour in atmospheres containing from 5 to 25 volume percent oxygen.

For both fibrous and non-fibrous materials it is seldom necessary to employ temperatures above 1000° C. The last traces of carbon can be removed and the last traces of metal compound oxidized by employing temperatures of up to 1000° C. and oxygen concentrations of about 20 volume percent.

The exact choice of reaction conditions of course depends on the shape and chemical composition of the starting organic material, and on the metal compound or metal compounds employed in the impregnation step. Illustrative of the permissible variation in reaction conditions (so long as ignition is avoided) are the following three methods for producing zirconium oxide fibers from impregnated cellulosic fibers.

In all three methods, cellulosic fibers are impregnated by immersing them in an aqueous solution of zirconyl chloride. Excess solution is then carefully removed and the impregnated fibers are dried. In the first method the carbonization-oxidation step is carried out by heating the fibers in air at a uniform rate from room temperature up to 400° C. over a 24-hour period. The fibers are then heated in air at temperatures between 400° C. and 600° C., preferably closer to 600° C., for an additional period of up to twenty-four hours. This procedure is illustrative of ignition control by slow oxidation over a long period of time.

In the second method the carbonization-oxidation step is carried out by heating the impregnated fibers in an argon atmosphere from room temperature to temperatures between 600° C. and 1000° C. in less than one hour. The oxidation is then carried out by maintaining the fibers at about 800° C. in an atmosphere of argon containing at least 5 volume percent water vapor for a period of one to ten hours. This procedure is illustrative of ignition control by rapid pyrolysis in a non-reactive atmosphere followed by rapid high temperature oxidation using oxidizing agents of relatively low reactivity.

In the third method the impregnated fibers are rapidly heated, often in less than five minutes, to about 400° C. in an atmosphere containing less than approximately 10 volume percent oxygen. The oxygen partial pressure is then gradually increased at constant temperature until the carbonaceous material from the cellulose and the metal compound have been oxidized, generally in a period of ½ to 3 hours. This procedure is illustrative of avoiding ignition by direct control of the oxygen partial pressure in the environment of the fiber.

The various methods for carrying out the process of this invention without ignition of the organic material, as illustrated above in the case of production of zirconium oxide fibers, apply generally to the production of any of the fibrous products of this invention; that is, impregnated fibrous materials can be heated in non-oxidizing atmosphere (conveniently provided by the use of vacuum or an inert gas) to temperatures between about 700° C. and 1000° C. in a period of less than one hour, followed by additional heating in this same temperature range in an atmosphere containing at least five volume percent water vapor for a period sufficient to complete the oxidation step, generally between one and 10 hours.

Similarly, the impregnated fibrous material can be rapidly heated to between about 350° C. and 600° C. in an atmosphere containing less than about 10 volume percent oxygen, and then maintained in this same temperature range while the oxygen partial pressure in the atmosphere surrounding the fibrous material is gradually increased to 20 volume percent or more over a period of a few minutes to a few hours depending on the particular system involved, the time being long enough to complete the oxidation step. Even though the oxygen partial pressure can be increased over short periods of time, abrupt increases should be avoided.

The process of this invention can also be practiced on a continuous basis. For example, continuous metal oxide filaments can be produced by providing a spool of cellulosic fiber, yarn or the like, drawing the filament or fiber first through an impregnating solution, then through a blotting and drying operation, and finally through one or more furnaces which provide carbonization and/or oxidation under the necessary controlled conditions to avoid ignition. The metal oxide fiber emerging from the final furnacing under operation can be continuously wound on another spool, thus providing an efficient continuous method for carrying out the process of the invention.

The carbonization of the impregnated organic materials and the removal of such carbon by oxidation are not necessarily separate and distinct steps. When heating of the impregnated material is first begun, pyrolysis to carbon is the predominant chemical reaction, and the carbonized material comprises predominantly carbon but also can contain small amounts of residual organic material, including hydrogen and oxygen. However, some slight oxidation of the carbon formed and of the metal present in the impregnated material can take place, particularly when the atmosphere employed contains an oxidizing gas. As heating continues and substantially all of the organic material is converted to carbon, oxidation by the oxidizing atmosphere of the carbon and of the metal with which the material had been impregnated becomes the predominant reaction. In the later stages of the heating process, oxidation of the last few metal atoms and of the last few carbon atoms is the only significant chemical reaction. In many instances, the addition of small amounts of water vapor to the atmosphere aids in removing the last traces of carbon.

Microscopic voids are produced in the material as carbon is oxidized. Maximum densification of the material is achieved by limiting the concentration of oxidizing gas and the temperature of the material during oxidation. This oxidation step normally requires between one and 48 hours to complete, depending on the metal oxide or metal oxide mixture. Many metal oxides, such as uranium oxide, zirconium oxide, iron oxide, copper oxide, chromium oxide and vanadium oxide, enhance the rate of carbon oxidation and relatively lower temperatures are normally used when these metal oxides are present in the material. Oxidation of the carbon at a faster rate (promoted by either increased oxidizing gas concentration or relatively higher temperature in early stages of this oxidation step) produces a less dense and weaker metal oxide product due to the voids remaining in the structure. The relatively higher temperatures may also initiate crystallite formation in the material which is detrimental to the metal oxide product in its formatory stages. Densification of the metal oxide relic is observed as shrinkage along all dimensions during oxidation. For fibers, the length-to-diameter ratio, as well as the geometry of the fiber cross-section, remains essentially the same as the starting organic fibers during conversion.

In a particularly preferred embodiment of the present invention, where a textile yarn containing a multiplicity of metal oxide fibers is desired, an impregnated cellulosic yarn is kept under tension during the carbonization and oxidation steps. Tensions in the 10 to 40 gram range have proven satisfactory for keeping 3300 denier/1440 filament rayon yarns straight during the carbonization and oxidation steps.

Although the metal oxide products as produced by the process of this invention are substantially amorphous (microcrystalline), their application is not limited to conditions and environments wherein the metal oxide products remain entirely in the microcrystalline state. The desirable mechanical properties of the metal oxide products invention are retained to a large degree even after some crystallization of the metal oxides has occurred. The mechanical properties of the products are seriously impaired only after the size of the crystallites is such that crystalline grains can be detected by conventional optical microscopic techniques, that is after the microcrystalline structure is replaced by relatively large crystalline areas. In the case of metal oxide fibers, mechanical properties become impaired when the size of the crystallites exceeds approximately one-tenth of the diameter of the fiber.

The metal oxide products of this invention which are most preferred are those which are composed almost entirely of one or more of the metal oxides of Table I hereinabove, and which contain only trace of insignificant amounts of other metal oxides or impurities.

The metal oxides listed in Table I are the oxides usually formed when an organic material impregnated with compounds of one or more metals is pyrolyzed and oxidized according to the process of this invention and represent the highest normal oxidation state of the metal. However the present invention includes metal oxide fibers, textiles and shapes comprising a total of at least 80 percent by weight of lower metal oxides (including oxides of non-integral valence states) of the elements of Table I, for example FeO, CrO and $UO_2$. The lower metal oxides can be obtained by partial reduction of the higher oxides with hydrogen at temperatures above 400° C., or can be obtained as intermediate oxidation states during the oxidation step in the process of this invention.

A particularly important class of metal oxide products are those comprising a total of at least 80 weight percent of one or more of the metal oxides having melting points above 1728° C. (the melting point of silica), and in particular products composed principally of one or more of the oxides $Al_2O_3$, BeO, CaO, $CeO_2$, MgO, $TiO_2$, $ThO_2$ and $ZrO_2$, which possess exceptional chemical inertness and strength at high temperatures. These metal oxides in dense, sintered forms comprise an important class of commercial refractory oxides. Fibers of these refractory metal oxides make good heat shields and ablation reinforcement materials, and can be employed for reinforcing plastics for use at relatively low temperatures, and metal and porcelains and other ceramic bodies for use at high temperatures. These refractory metal oxide fibers make excellent filters for corrosive gases and liquids at elevated temperatures. Applications include filtering molten metals, molten salts, superheated air and furnace exhaust gases. In addition to filtering applications, the metal oxide products of this invention are also useful as structural elements and as thermal insulation elements for use at high temperatures and in corrosive atmospheres, and the products of this invention which contain cerium oxide, thorium oxide, and zirconium oxide are particularly advantageous for use in contact with corrosive or alkaline liquids such as battery electrolytes. Zirconium oxide fibrous materials are especially useful because of their low thermal conductivity and because of their extreme high temperature stability even in alkaline environments.

Fabrication of ceramic blocks, linings, crucibles and more complex shapes are often difficult because of the problems attendant to fusing and sintering them into a cohesive mass. Refractory bodies frequently suffer self-destruction if temperatures are varied abruptly due to their poor resistance to thermal shock. Starting with these refractory fibers in the form of loose fibers, yarn, paper or various forms of woven textiles, shaping and sintering to cohesive, complex shapes can be achieved readily. Thin-walled tubes may be made by this method and applications include furnace liners, pyrometer protection tubes and piping for liquid metals.

The metal oxides of Table I which have relatively low melting or decomposition temperatures, for example, the oxides of vanadium, molybdenum, tungsten, manganese, cobalt, nickel, copper, zinc, cadmium and lead are known to be useful as catalysts in a variety of processes. The fiber form of these oxides, as produced by the process of this invention, possess the same catalytic properties and catalytic uses as the conventional non-fiber form of these oxides. A particularly useful form of catalyst, for example, is a fiber of this invention which comprises from 80 to 98 percent of one of the refractory metal oxides and from 20 to 2 percent of one of the lower melting point catalytically active metal oxides.

Micron-size fibers containing uranium oxide or plutonium oxide are useful for fuel elements in nuclear reactors, especially those designed for radiation-chemical processing by the use of the kinetic energy of fission recoil particles. The fibers can be composed of only uranium oxide or plutonium oxide, or as a mixture with other metal oxides of Table I, such as BeO, $Al_2O_3$, $ZrO_2$ and $ThO_2$. For use as fuel elements in other types of nuclear reactors, for research and testing purposes, vehicle propulsion, or electrical power generation, it may be desirable to coat these fibers with an impervious material to prevent the escape of radioactive fission products into the reactor coolant stream. For use at high temperatures or in non-oxidizing atmospheres, uranium dioxide, $UO_2$, is the preferred form and is obtained by reducing the uranium trioxide, $UO_3$, with hydrogen gas at 500–600° C. A preferred fiber of this invention for use as a nuclear fuel element under oxidizing conditions is one which comprises from 20 to 60 weight percent uranium trioxide and the balance (80 to 40 weight percent) aluminum or zirconium oxide.

Metal oxide fibers of this invention containing uranium dioxide are generally useful as nuclear fuel elements, and fibers comprising a mixture of uranium dioxide and thorium dioxide are particularly useful as fuel elemnts in breeder reactors.

The metal oxide shapes of this invention have a wide variety of uses. The metal oxide films of this invention, which are highly uniform in thickness and which can be as thin as 10 microns, can be used as thin dielectric or heat insulating films or sheets (for example aluminum oxide films and other ceramic oxide films). The metal oxide shapes of this invention other than films can be used as light weight structural members, as heat and/or electrical insulators, as battery separators, and the like. Metal oxide shapes prepared from organic foams or sponges are also useful as filters. For use as filters it is preferred that the metal oxide shapes of this invention be prepared from cellulosic foams or sponges characterized by open porosity, uniform pore size and low density.

The following examples further illustrate the process and metal oxide products of this invention. Throughout the present specification, including the illustrative examples, the temperatures given are furnace temperatures. The actual temperature of the structure undergoing processing by the method of this invention, as discussed hereinabove, may differ somewhat from the furnace temperature.

EXAMPLE 1

A 50 ft. length of rayon tire yarn (3300 denier/1440 filaments/1 ply) weighting 5.6 grams was preswollen by immersion in water for 1.5 hours. After centrifuging out excess water, the yarn contained 0.70 gm. water/gm. rayon and was immresed in 2.8 molar aluminum chloride (aqueous) solution held at 22° C. for a period of 22 hours. After centrifuging excess solution from the yarn and allowing it to dry, the yarn contained 0.79 gm. of aluminum chloride salt/gm. rayon and retained its original luster and flexibility. A two-foot length of the yarn loaded with aluminum chloride was converted to alumina yarn by heating in air to 400° C. at a rate of 100° C./hour and maintaining the temperature at 400° C. for two additional hours. To remove final traces of carbon from the alumina yarn, it was heated at 800° C. in air for a period of six hours. The yarn was maintained under a tension of 10 grams during conversion to keep the filaments in the yarn straight.

The alumina yarn had a high luster and flexibility much like the starting rayon yarn. The converted yarn had a denier of 1260 and had shrunk to 46 percent of its original length. In four measurements of tensile strength using an Instron testing machine, two-inch lengths of the alumina yarn supported 1.6, 1.6, 1.6 and 1.9 pounds tension before breaking. Individual filaments were next taken from the alumina yarn and their tensile strengths determined using a modified analytical chain type balance for applying a known amount of tension to the fibers. In three measurements, the filaments supported 2.0, 1.6 and 1.3 grams before breaking. Tensile strengths of the individual alumina filaments are calculated to be between 85,000–130,000 pounds per square inch.

EXAMPLE 2

This example illustrates the impregnation and conversion of a woven cloth into a woven metal oxide (alumina) cloth. A one-square foot piece of cloth weighing 41.4 gm., made up of textile yarn (3300 denier/1100 filaments/3 ply), and having 17 yarns/inch warp and 8½ yarns/inch fill, was preswelled by immersion in water for one hour. After thorough blotting, the cloth contained 0.81 gram water per gm. cloth. The water-swollen cloth was immersed in aqueous aluminum chloride solution for a period of 65 hours. Solution concentration at the end of this period was 2.5 molar $AlCl_3$. After centrifuging excess solution from the cloth, it was dried rapidly in recirculating air heated to 50° C. The dried cloth contained 0.69 gm. salt/gm. of rayon and was converted to alumina by heating in air gradually to 400° C. in a period of 48 hours. Traces of carbon were removed from the cloth by heating in air at 800° C. for five hours.

The white alumina cloth so produced had a high luster and was very flexible. The alumina cloth weighed 7.1 grams and had shrnuk to an area of 0.16 square foot. A pull of 3.6 pounds per inch of width was required to tear the cloth. Spectographic analysis of the alumina cloth showed it to contain 99.5 percent $Al_2O_3$. The major trace impurity was Zn, which was contained in the starting rayon cloth and could have been eliminated by washing the rayon with dilute hydrochloric acid. X-ray powder diffraction analysis showed the cloth to be essentially amorphous alumina. A trace of poorly crystallized gamma-alumina was present as indicated by a broad diffraction band at a 20 diffraction angle of 44–46 degrees.

EXAMPLE 3

A piece of rayon felt, weighing 30 ounces/yd.$^2$, was impregnated with aluminum chloride salt and converted to alumina felt by the method described in Example 2. The alumina felt weighed 19 ounces/yd.$^2$ and had a bulk density of 7.9 pounds/ft.$^3$. The felt possessed a high degree of flexibility and a breaking strength of two pounds/inch of width.

EXAMPLE 4

A one-square foot piece of rayon cloth weighing 56.2 gms., made up of high-tenacity rayon yarn in a basket weave and having a yarn count of 19 yarns/inch in both warp and fill directions, was preswollen in water and immersed in a 2.86 molar zirconyl chloride aqueous solution at 22° C. for a period of 46 hours. The solution concentration at the end of the immersion period was 2.55 molar. The cloth was centrifuged and dried rapidly in recirculating air heated at 50° C. The dried cloth contained 0.96 grams of zirconyl chloride salt/gram rayon. The salt-loaded rayon cloth was converted to zirconium oxide cloth by heating in air gradually to 500° C. in a period of 30 hours (about 16° C. per hour). The cloth was maintained at 500° C. in air for six additional hours to remove remaining traces of carbon. The tan-colored zirconium oxide cloth weighed 14.2 grams and had a yarn count of 48 yarns/inch. The cloth was flexible and had a breaking strength of six pounds per inch of width. X-ray diffraction pattern showed the zirconia cloth to be predominately amorphous but containing trace amounts of poorly crystallized tetragonal zirconia.

EXAMPLE 5

Forty-five grams of 1.5 denier regular viscose fibers were impregnated with a mixture of uranyl chloride and aluminum chloride by immersion of the preswollen fibers in a single aqueous solution 0.4 molar in uranyl chloride and 2.8 molar in aluminum chloride for a period of 48 hours. After centrifugation to remove excess solution and drying the fibers in a stream of warm air, the loaded rayon fibers were converted to the oxide form by heating in air at a rate of 50° C./hr. to 400° C., and were freed of carbon by maintaining them in air at 400° C. for 4 hours. The product metal oxide fibers were composed of 56.5% by weight $UO_3$ and 43.5% by weight $Al_2O_3$. The amber colored mixed oxide fibers had a high degree of luster and had tensile strengths very nearly the same as the pure alumina fibers described in Example 1. The mixed oxide fibers had no crystal structure, as shown by X-ray diffraction.

EXAMPLE 6

Four aqueous solutions were prepared which contained salts in the following concentrations: (a) 2.3 molar in $AlCl_3$ and 0.34 molar in $NiCl_2$, (b) 2.3 molar in $AlCl_3$ and 0.32 molar in $CrCl_3$, (c) 2.3 molar in $AlCl_3$ and 0.27 molar in $FeCl_3$ and (d) 2.3 molar in $AlCl_3$ and 0.33 molar in $CuCl_2$.

Four separate samples of 1.5 denier regular viscose rayon fibers were preswollen and immersed in the four solutions, respectively, for 48 hours. Excess solution was removed by centrifugation and the fibers were dried in warm air. The impregnated fibers were then heated to 400° C. in air at a rate of 50° C. per hour and were then maintained in air at 400° C. for four additional hours. The four metal oxide fibers which resulted comprised, respectively, 13.0 weight percent nickel oxide, 11.7 weight percent chromium oxide, 15.9 percent iron oxide, and 13.2 percent copper oxide, with the balance in each case aluminum oxide. All four of the mixed oxide fibers had high tensile strength and were completely amorphous.

EXAMPLE 7

A knitted rayon sock impregnated with a thorium compound, an article of commerce for use as an incandescent mantle in a Coleman gas lantern, was converted to the oxide by heating in air to 400° C. in a period of 7 hours and holding at 400° C. in an oxygen stream for an additional 24 hours. After this treatment the rayon was completely decomposed and the carbon volatilized from the knitted sock. The resulting sock was composed of white, lustrous thoria fibers of an amorphous structure. The sock was extremely flexible, similar to the starting rayon knitted sock. When viewed under the microscope at a magnification of 50, the thoria fibers appeared transparent to light (similar to window glass).

A second, and identical, knitted rayon sock impregnated with a thorium compound was burned off to the oxide form rapidly with a gas flame as is normally done for use as an incandescent gas mantle. The resulting thoria sock contained white fibers with a dull luster. The fibers also were very brittle and had little strength. X-ray diffraction pattern showed the thoria to be fairly well crystallized. The brittleness and low strength of thoria fibers made by burning off the rayon is attributed to crystallization and a large number of voids remaining in the fiber structure. In contrast, useful properties, such as high strength and flexibility, are developed by slow conversion to the amorphous metal oxide form at a low temperature by the process of this invention, as demonstrated in the preceding paragraph of this example.

EXAMPLE 8

This example shows the undesirable effects of ignition on a zirconium oxide felt.

Two identical samples of rayon felt, 6 inches square, were immersed in the same aqueous solution of 2.17 molar zirconyl chloride. After 200 hours the cloth samples were removed from the solution, blotted and centrifuged to remove excess solution, and were dried. The first sample was then treated according to the process of this invention under the following conditions: Heated in air at 50° C. per hour to 350° C. and held at this temperature in air for 4 hours. The temperature was then raised to 600° C. (in air) over a two hour period and maintained at 600° C. for 2 hours.

The second sample was treated as follows: The sample was introduced in air into a furnace already heated to 800° C. and was removed after one half hour.

The final product obtained by the process of this invention had decreased in dimensions to 2⅛ inch by 2⅛ inch, an average dimensional shrinkage of 65 percent, while the other sample was 4¼ inch by 4¼ inch, a dimensional shrinkage of only 29 percent. Sample A, the product of this invention, was strong and flexible, while Sample B was extremely weak, crumbly and powdery.

EXAMPLE 9

In this example, cellulosic fibers were immersed in an aqueous solution of the chlorides of nickel, zinc and iron, the concentration of ions in solution being such that the metals would be adsorbed in the cellulose in the same ratio as the elements nickel, zinc and iron are normally present in crystalline spinels. After immersion for about 24 hours, the fibers were removed from solution, blotted and centrifuged to remove excess impregnating solution from the fiber surfaces and were then dried in air at about 50° C. The fibers were then heated in air to 350° C. over a period of 24 hours. The resulting fibers comprising mixed oxides of nickel, zinc and iron showed only diffuse X-ray diffraction patterns and were non-magnetic, in contrast to crystalline spinels of similar composition.

EXAMPLE 10

Aluminum oxide film

Several 2 by 2 inch pieces of cellophane film were immersed in a 2.0 molar aqueous solution of aluminum chloride for a period of 18 hrs. The cellophane film used was of the type generally employed as cigarette package wrapper and was washed with acetone to remove the moistureproofing lacquer from its surfaces. After immersion the films were wiped free of unimbibed solution and dried in a dessicator between two pieces of paper to keep the film flat. The film pieces were next heated in air at a rate of 10° C./hr. to 365° C. and held at that temperature for 8 hrs. They were further heated at 800° C. for 20 hours to remove traces of carbon.

The product film pieces were smooth, had dimensions approximately 0.8 x 0.8 inch and thickness of 10–12 microns. The films were flexible, colorless and completely transparent like window glass. The films were composed of very poorly crystalline gamma-alumina of 97% purity.

EXAMPLE 11

Mixed aluminum oxide-uranium oxide film

Three pieces of the same cellophane film as used in Example 10 were immersed in an aqueous solution of 2.0 molar aluminum chloride mixed with 0.08 molar uranyl chloride. After immersion the films were wiped free of unimbibed solution and dried in a dessicator between paper to keep the films flat. The films were next heated in air at a rate of 10° C./hr. to 365° C. and held for 8 hrs. at that temperature.

The products of this treatment were smooth film pieces with dimensions approximately 50% of the starting cellophane film. Thickness of the films was 12 microns. The film pieces were substantially smooth, transparent and with a yellow coloration. The films were composed of 27 wt. percent $UO_3$ and 72 wt. percent $Al_2O_3$ and were amorphous as indicated by X-ray diffraction analysis.

EXAMPLE 12

Uranium oxide foam

A piece of polyether foam having an open-cell structure and measuring 3.0 x 3.1 x 1.5 cm. was immersed in a n-butyl acetate solution containing 60 cm. uranyl nitrate hexahydrate per 100 ml. for a 1 hr. period. The foam was then blotted and allowed to dry.

The salt-loaded foam was pyrolyzed in a vacuum tube furnace which has heated at a rate of 40° C./hr. to 900° C. and held at 900° C. for one hour. The rigid carbonized foam was next held at 750° C. and air admitted to the furnace slowly over a period of four hours to oxidize the carbon from the foam.

The product foam was approximately 70% of the original dimensions of the starting polyether foam and had the same open-cell structure but of reduced dimensions.

The foam had 91% open porosity; cell dimensions were in the range of 50–75 microns. The color of the foam was greenish black, indicative of the $U_3O_8$ composition.

What is claimed is:

1. A process for producing metal oxide fibers, textiles and shapes which comprises (1) impregnating a preformed organic polymeric material with a compound of one or more of the metals beryllium, magnesium, calcium, strontium, barium, scandium, yttrium, lanthanium, cerium, titanium, zirconium, hafnium, vanadium, niobium, tantalum, chromium, molybdenum, tungsten, manganese, iron, cobalt, nickel, copper, zinc, cadmium, aluminum, gallium, silicon, tin, lead, thorium, uranium and plutonium, and (2) heating said impregnated material to a temperature sufficiently high to carbonize and oxidize said organic material and convert said metal compound to metal oxide, at least a portion of said heating step being carried out in an oxidizing atmosphere, and said heating step being carried out without ignition of said material.

2. A process in accordance with claim 1 wherein said material is impregnated by immersion in a solvent solution containing said metal compound, and wherein excess impregnating solution is removed from said impregnated organic material and said impregnated material is dried prior to said carbonization-oxidation step.

3. The process in accordance with claim 2 wherein said organic material is cellulosic fibrous material.

4. The process in accordance with claim 2 wherein said organic material is a non-fibrous cellulosic material.

5. The process in accordance with claim 3 wherein said carbonization-oxidation step comprises heating said impregnated fibrous material to a temperature between about 350° C. and about 900° C. at a rate of not more than 100° C. per hour in a atmosphere containing from about 5 to about 25 volume percent oxygen, provided said temperature does not exceed the melting or decomposition temperature of said metal oxide.

6. The process in accordance with claim 3 wherein said fibers are maintained under tension during said carbonization-oxidation step.

7. The process in accordance with claim 3 wherein said carbonization-oxidation step comprises heating said impregnated fibrous material in a non-oxidizing atmosphere to temperatures between about 700° C. and 1000° C. in less than one hour followed by heating in said same temperature range in an atmosphere containing at least 5 volume percent water vapor until oxidation of said material is substantially complete.

8. The process in accordance with claim 3 wherein said carbonization-oxidation step comprises heating said impregnated fibrous material in an atmosphere containing less than about 10 volume percent oxygen to temperatures between about 350° C. and 600° C. in less than one hour and then gradually increasing the oxygen concentration to about 20 volume percent or more and maintaining said temperature of 350° C. to 600° C. until oxidation of said material is substantially complete.

9. The process in accordance with claim 3 wherein said organic material is a rayon fiber, said fiber is impregnated by immersion of an aqueous solution of aluminum chloride, and said impregnated fiber, after removal of excess impregnating solution and drying, is heated in air to 400° C. at a rate of about 100° C. per hour and is maintained in air at 400° C. for at least two additional hours.

10. The process in accordance with claim 3 wherein said organic material is a rayon fiber, said fiber is impregnated by immersion in an aqueous solution of a zirconium compound, and said impregnated fiber, after removal of excess impregnating solution and drying is heated in air to about 600° C. over a 24 hour period and maintained in air at about 600° C. for an additional period of up to 24 hours.

11. The process in accordance with claim 4 wherein said organic material is a non-fibrous cellulosic film impregnated by immersion in an aqueous solution of an aluminum compound and, after removal of excess solvent and drying, is heated in an oxygen-containing atmosphere to about 365° C. to carbonize and oxidize said film and is further heated in an oxygen-containing atmosphere to about 800° C. to produce a film of aluminum oxide.

12. The process in accordance with claim 11 wherein said aqueous solution contains both an aluminum compound and a uranium compound and said product film contains both aluminum oxide and uranium oxide.

13. The process in accordance with claim 4 wherein said organic material is a non-fibrous polyether foam impregnated by immersion in an aqueous solution of a uranium compound and, after removal of excess solvent and drying, is heated in vacuum to about 900° C. to carbonize said foam and is further heated in an oxygen-containing atmosphere at about 750° C. to produce a foam of uranium oxide.

References Cited

UNITED STATES PATENTS

| | | | |
|---|---|---|---|
| 1,993,778 | 3/1935 | Francis | 67—100 |
| 3,065,091 | 11/1962 | Russell et al. | 106—57 X |
| 3,082,099 | 3/1963 | Beasley et al. | 106—57 X |
| 3,082,103 | 3/1963 | Wainer | 106—57 X |
| 3,240,560 | 3/1966 | Spear | 23—142 |

OTHER REFERENCES

BMI-1117, Effect of Ceramic or Metal Additives in High-$UO_2$ Bodies, 1956, p. 5.

L. DEWAYNE RUTLEDGE, *Primary Examiner.*

L. A. SEBASTIAN, *Assistant Examiner.*